(12) United States Patent
Lee

(10) Patent No.: US 8,717,969 B2
(45) Date of Patent: May 6, 2014

(54) METHOD FOR UPLINK POWER CONTROL IN OFDMA TDD SYSTEM

(75) Inventor: Dong-Kwan Lee, Yongin-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 95 days.

(21) Appl. No.: 13/142,256

(22) PCT Filed: Dec. 30, 2009

(86) PCT No.: PCT/KR2009/008004
§ 371 (c)(1),
(2), (4) Date: Jun. 24, 2011

(87) PCT Pub. No.: WO2010/077107
PCT Pub. Date: Jul. 8, 2010

(65) Prior Publication Data
US 2011/0261731 A1 Oct. 27, 2011

(30) Foreign Application Priority Data

Dec. 31, 2008 (KR) .................. 10-2008-0138908

(51) Int. Cl.
*H04B 7/185* (2006.01)
(52) U.S. Cl.
USPC .............................. 370/318; 370/252; 370/465
(58) Field of Classification Search
USPC .......................................... 370/252, 318, 465
See application file for complete search history.

(56) References Cited

U.S. PATENT DOCUMENTS

| 5,371,734 | A  | * | 12/1994 | Fischer ......................... 370/311 |
| 2002/0168034 | A1 | * | 11/2002 | Yang et al. .................... 375/342 |
| 2006/0159038 | A1 |   | 7/2006 | Hasty, Jr. et al. |
| 2006/0234704 | A1 | * | 10/2006 | Lee et al. ...................... 455/434 |
| 2007/0268846 | A1 | * | 11/2007 | Proctor et al. ................. 370/279 |
| 2008/0031368 | A1 | * | 2/2008 | Lindoff et al. ................ 375/260 |
| 2008/0056220 | A1 | * | 3/2008 | Yu et al. ........................ 370/342 |
| 2008/0063117 | A1 | * | 3/2008 | Cheng et al. .................. 375/340 |
| 2008/0130599 | A1 | * | 6/2008 | Horikoshi et al. ............ 370/338 |
| 2008/0232234 | A1 | * | 9/2008 | McCoy et al. ................. 370/203 |
| 2009/0073062 | A1 | * | 3/2009 | Tang et al. .................... 343/703 |
| 2010/0128765 | A1 | * | 5/2010 | Schober et al. ............... 375/220 |

FOREIGN PATENT DOCUMENTS

| KR | 1020000039090 A | 7/2000 |
| KR | 1020060064720 A | 6/2006 |
| KR | 1020070049508 A | 5/2007 |

OTHER PUBLICATIONS

Kourosh Parsa, "Survey of WiMAX, LTE and UMB", Dec. 30, 2007.*
International Search Report for PCT/KR2009/008004 filed on Dec. 30, 2009.
Written Opinion for PCT/KR2009/008004 filed on Dec. 30, 2009.

* cited by examiner

*Primary Examiner* — Jason Mattis
(74) *Attorney, Agent, or Firm* — Sughrue Mion, PLLC

(57) ABSTRACT

The present invention relates to a method for uplink power control in an OFDMA TDD system. The method for uplink power control according to the present invention comprises: calculating an RSSI average by using RSSI measured from a downlink signal; and carrying out an uplink power control based on the RSSI average, with the RSSI average being calculated by using a weight that is determined depending on a channel variation rate and link symmetry.

8 Claims, 3 Drawing Sheets

|  | α | β | Additional CINR | Required ADC margin |
|---|---|---|---|---|
| 1T1R | 1/4 | 1/16 | 8dB | 16dB |
| 1T2R | 1/16 | 1/1 | 9dB | 22dB |
| CDD | 1/4 (1/16) | 1/1 | 9dB (10dB) | 22dB (21dB) |
| SFD | 1/4 | 1/16 | 7dB | 15dB |

Figure 1

|  | α | β | Additional CINR | Required ADC margin |
|---|---|---|---|---|
| 1T1R | 1/4 | 1/16 | 8dB | 16dB |
| 1T2R | 1/16 | 1/1 | 9dB | 22dB |
| CDD | 1/4 (1/16) | 1/1 | 9dB (10dB) | 22dB (21dB) |
| SFD | 1/4 | 1/16 | 7dB | 15dB |

Figure 2

|      | α        | β    | Additional CINR | Required ADC margin |
|------|----------|------|-----------------|---------------------|
| 1T1R | 1/1      | 1/16 | 3dB             | 13dB                |
| 1T2R | 1/16     | 1/1  | 9dB             | 22dB                |
| CDD  | 1/4 (1/16) | 1/1 | 9dB (10dB)      | 22dB (21dB)         |
| SFD  | 1/2      | 1/4  | 5dB             | 13dB                |

Figure 3

|  | α | β | Additional CINR | Required ADC margin |
|---|---|---|---|---|
| 1T1R | 1/16 | 1/4 | 8dB | 16dB |
| 1T2R | 1/16 | 1/4 | 6dB | 16dB |
| CDD | 1/16 | 1/16 | 5dB | 15dB |
| SFD | 1/16 | 1/16 | 6dB | 15dB |

METHOD FOR UPLINK POWER CONTROL IN OFDMA TDD SYSTEM

TECHNICAL FIELD

The present invention relates to a method for uplink power control in OFDMA (Orthogonal Frequency Division Multiple Access) TDD (Time Division Duplex) system.

BACKGROUND ART

One big advantage of the system over FDD (Frequency Division Duplex) system is channel reciprocity. The channel reciprocity is based on the assumption that a property of downlink channel is the same as that of uplink channel in same frequency bandwidth. For example, if a reception side sends sounding signals through sounding channel (it composes uplink channel), a transmission side can obtain information about downlink channel by estimating the uplink channel by using sounding signals.

If we can exploit the reciprocity of channel sufficiently, we can greatly reduce required CINR, which is very important for most mobile communication systems.

There are two deciding factor of the channel reciprocity: velocity and TX-RX link symmetry. If a velocity of user is high (fast fading channel), we can not utilize the channel reciprocity effectively. However, if the velocity of user is low, we can obtain the channel reciprocity by maintaining appropriate TX-RX link configuration.

DISCLOSURE

Technical Problem

Therefore, the present invention has been made to efficiently perform uplink power control by using the channel reciprocity, and it is an object of the present invention to provide a method for uplink power control in which uplink power control is efficiently performed by appropriately controlling the averaging factor for RSSI (Received Signal Strength Indicator) measurement at the MS (Mobile Station) and CINR (Carrier to Interference and Noise Ratio) measurement at the BS (Base Station) according to the Doppler frequency and the TX-RX link symmetry.

Technical Solution

According to one aspect of the present invention, there is provided a method for uplink power control in OFDMA (Orthogonal Frequency Division Multiple Access) TDD (Time Division Duplex) system, the method comprising: calculating an RSSI (Received Signal Strength Indicator) average by using RSSIs measured from downlink signals; and carrying out an uplink power control based on the RSSI average, wherein the RSSI average is calculated by using a weight that is determined according to a channel variation rate and a link symmetry, According to another aspect of the present invention, there is provided a method for uplink power control in OFDMA (Orthogonal Frequency Division Multiple Access) TDD (Time Division Duplex) system, the method comprising: calculating an CINR (Carrier to Interference and Noise Ratio) average by using CINRs measured from uplink signals; and carrying out an uplink power control based on the CINR average, wherein the CINR average is calculated by using a weight that is determined according to a channel variation rate and link symmetry.

Advantageous Effects

The present invention can efficiently perform an uplink power control by appropriately determining the RSSI average and/or CINR average by using the weight that is determined depending on the channel variation rate and link symmetry.

Also, the present invention can obtain better system performance than 1T2R system by appropriately determining the RSSI average and/or CINR average by using the weight, even if we do not know the velocity of the MS in 2T2R system, SFD system or MIMO system.

DESCRIPTION OF THE DRAWINGS

The above and other aspects, features and advantages of the present invention will become more apparent from the following detailed description when taken in conjunction with the accompanying drawings in which:

FIG. 1 is a diagram illustrating a performance when the Doppler frequency is unknown;

FIG. 2 is a diagram illustrating a performance when the Doppler frequency is small (PED-A 3 k m/h); and FIG. 3 is a diagram illustrating a performance when the Doppler frequency is large (VEH-A 60 km/h).

MODE FOR INVENTION

Preferred embodiments of the present invention will now be described in detail with reference to the annexed drawings. In the following description, a detailed description of known functions and configurations incorporated herein has been omitted for clarity and conciseness.

The present invention can efficiently perform OLPC (Open Loop Power Control) and CLPC (Closed Loop Power Control) by appropriately determining the RSSI (Received Signal Strength Indicator) average and/or CINR (Carrier to Interference and Noise Ratio) average in OFDMA TDD system. And, the present invention uses the channel variation rate and link symmetry so as to optimally determine the RSSI average and/or CINR average.

With relation to this, the present invention uses the following equation 1 to average the RSSI/CINR of each frame. For reference, in the following equation 1, the RSSI is measured from downlink signals and the CINR is measured from uplink signals, $\alpha$ and $\beta$ are weights.

At MS: $RSSI_{avg} = \alpha * RSSI + (1-\alpha) * RSSI_{avg}$. [Equation 1]

At BS: $CINR_{avg} = \beta * CINR + (1-\beta) * CINR_{avg}$.

Referring to equation 1, the OLPC (Open Loop Power Control) can be performed based on the $RSSI_{avg}$ and the CLPC (Closed Loop Power Control) can be performed based on the $CINR_{avg}$. For reference, if the link symmetry can be obtained and the channel variation is slow between DL-RX and UL-TX, it is desirable to use large $\alpha$ and small $\beta$. However, if not, it is desirable to use small $\alpha$ and medium (or large) $\beta$.

Meanwhile, the link symmetry has been affected by the number of transmission antennas and reception antennas. Thus, hereafter, the present invention will be described based on a mobile WiMAX system with maximum 2 transmission antennas and 2 reception antennas.

[1T1R System]

In one transmission antenna and one reception antenna system, the link symmetry can be obtained automatically. Of course, if the MS has multiple reception antennas, the MS should use only the main path signal to measure the RSSI.

Thus, if the Doppler frequency is low, it is desirable to use large α and small β. On the contrary, if the Doppler frequency is high, it is desirable to use small α and medium or large β.

[1T2R System]

In one transmission antenna and two reception antennas system, the link symmetry can not be obtained. Thus, the MS may use all reception antennas to measure the RSSI. In this case, it is desirable to use small α and large β because there is no link symmetry.

[2T2R System]

In two transmission antennas and two reception antennas system, the link symmetry can be obtained only when following conditions are satisfied.

1) The MS should use only the main path signal to measure the RSSI if the MS has multiple reception antennas.
2) The BS should use orthogonal type transmission diversity, e.g. SFD (Space Frequency Diversity) and open loop MIMO. For reference, CDD is not the orthogonal type diversity because its pilots from different antenna are intermingled after reception.

[SFD System]

SFD (Space Frequency Diversity) may be applied to preambles or pilots. Here, we assume that the RSSI is measured using only preambles. When the SFD is used and the Doppler frequency is small, it is desirable to use large α and small β, which will give the minimum required CINR. However, to obtain link symmetry, α should be less than 0.5 (For 4T4R system, it shall be less than 0.25). If the Doppler frequency is high, it is desirable to use small α and medium or large β. Meanwhile, the CDD does not give the link symmetry, thus should follow the same algorithm as the 1T2R system.

[MIMO System]

If there is downlink MIMO burst, the link symmetry can be easily obtained by averaging the RSSI from both reception antennas using MIMO pilots instead of preambles. Thus, if there is MIMO burst in a given frame and the Doppler frequency is small, it is desirable to use large α (it may be 1.0) and small β. However, if the Doppler frequency is high, it is desirable to use small α and medium or large β. Meanwhile, this scheme can be used whenever there is MIMO burst, regardless of to whom the burst is destined for.

Hereinafter, the Doppler frequency estimation will now be described.

The Doppler frequency estimation is important to decide α and β, thus it is desirable to utilize maximum link symmetry. The amount of Doppler frequency can be conjectured by observing the variation of pilots. The easiest way may be computing correlation between pilots allocated in a same sub-carrier. If the Doppler frequency does not change quickly, we can obtain quite accurately an estimated value of the Doppler frequency by averaging large amount of computations. Also, using following simulations, a mapping table between the correlation and the Doppler frequency can be obtained.

Simulation conditions are as follows.

There is 5 ms time difference between DL-RX (downlink reception) and UL-TX (uplink transmission), which is OLPC latency. The latency for CLPC (Closed Loop Power Control) is 4 frames. Required CINR is obtained by observing the distribution of uplink frame CINR (for simplicity). Target ADC saturation rate is 0.1% (There is 1 frame among 1000 frames which saturates ADC with given ADC margin). All 1024 sub-carriers are used instead of using only 840 sub-carriers (for simplicity).

Meanwhile, simulation results are illustrated in FIGS. 1 to 3.

Here, FIG. 1 shows a performance when the Doppler frequency is unknown, FIG. 2 shows a performance when the Doppler frequency is small (PED-A 3 km/h), and FIG. 3 shows a performance when the Doppler frequency is large (VEH-A 60 km/h).

For reference, in simulation results, additional CINR is the additionally needed CINR when power control is used compared to the required CINR obtained from short-term fading link-level simulation.

In summary, the present invention uses required CINR to measure system performance. However, as known by simulation results, it also reduces the ADC (Analog to Digital Converter) margin, which is necessary to accommodate high PAPR (Peak to Average Power Ratio) signal of OFDMA system under fading channel.

In particular, even if we do not know the amount of the Doppler frequency for 2T2R system, SFD system or MIMO system, the present invention can still obtain better system performance than 1T2R system by selecting α and β appropriately.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A method for uplink power control in OFDMA (Orthogonal Frequency Division Multiple Access) TDD (Time Division Duplex) system, the method comprising:

measuring a RSSI (Received Signal Strength Indicator) of downlink signals;

updating a RSSI (Received Signal Strength Indicator) average by calculating a weighted sum of the measured RSSIs and a previous RSSI average; and carrying out an uplink power control based on the updated RSSI average, wherein weights used for calculating the weighted sum are determined according to at least one of a channel variation rate and a link symmetry, wherein the RSSI average is updated by using the following equation:

$$RSSI^{current}_{avg} = \alpha * RSSI + (1-\alpha) * RSSI^{previous}_{avg},$$

wherein $RSSI^{current}_{avg}$ and $RSSI^{previous}_{avg}$ are the updated RSSI average and the previous RSSI average, respectively, RSSI is the measured RSSI, and α is a real number higher than 0 and lower than 1, and wherein α is set to a first value when the channel variation rate is lower than a predetermined value, α is set to a second value when the channel variation rate is not lower than the predetermined value, and the first value is higher than the second value.

2. The method of claim 1, wherein the channel variation rate is determined by an estimated value of a Doppler frequency.

3. The method of claim 2, wherein the estimated value of the Doppler frequency is calculated by using pilots.

4. The method of claim 1, wherein the RSSI is calculated by using the main path signals if multiple reception antennas are applied.

5. The method of claim 1, wherein the RSSI is calculated by using preambles if space-frequency diversity is applied.

6. The method of claim 1, wherein the RSSI is calculated by using pilots if MIMO (Multiple Input Multiple Output) system is applied.

7. A method for uplink power control in OFDMA (Orthogonal Frequency Division Multiple Access) TDD (Time Division Duplex) system, the method comprising:
- measuring a CINR (Carrier to Interference and Noise Ratio) of uplink signals;
- updating a CINR average by calculating a weighted sum of the measured CINR and a previous CINR average; and
- carrying out an uplink power control based on the updated CINR average,
- wherein weights used for calculating the weighted sum are determined according to at least one of a channel variation rate and a link symmetry,
- wherein the CINR average is updated by using the following equation:

$$CINR^{current}_{avg} = \beta * CINR + (1-\beta) * CINR^{previous}_{avg},$$

wherein $CINR^{current}_{avg}$ and $CINR^{previous}_{avg}$ are the updated CINR average and the previous CINR average, respectively, CINR is the measured CINR, and $\beta$ is a real number higher than 0 and lower than 1, and
wherein $\beta$ is set to a first value when the channel variation rate is lower than a predetermined value, $\beta$ is set to a second value when the channel variation rate is not lower the predetermined value, and the first value is lower than the second value.

8. The method of claim 7, wherein the link symmetry is determined by a number of reception antennas.

* * * * *